(12) United States Patent
Kim

(10) Patent No.: US 11,952,033 B2
(45) Date of Patent: Apr. 9, 2024

(54) STEERING DEVICE AND CONTROL METHOD THEREOF

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/076,885

(22) Filed: Dec. 7, 2022

(65) Prior Publication Data

US 2023/0174136 A1 Jun. 8, 2023

(30) Foreign Application Priority Data

Dec. 8, 2021 (KR) .................. 10-2021-0174503

(51) Int. Cl.
| | |
|---|---|
| *B62D 1/04* | (2006.01) |
| *B60K 35/28* | (2024.01) |
| *B60W 50/14* | (2020.01) |
| *B62D 1/06* | (2006.01) |
| *B60K 35/00* | (2006.01) |

(52) U.S. Cl.
CPC .................. *B62D 1/06* (2013.01); *B62D 1/04* (2013.01); *B60K 35/00* (2013.01); *B60K 35/28* (2024.01); *B60K 2360/178* (2024.01); *B60W 2050/143* (2013.01); *B60W 2050/146* (2013.01)

(58) Field of Classification Search
CPC .......... B62D 1/04; B62D 1/043; B62D 1/046; B62D 1/06; B62D 1/065; B62D 1/08; B62D 1/10; B62D 1/11; B60R 21/09; B60K 2370/178; B60K 35/00; B60W 50/14; B60W 2050/143; B60W 2050/146
See application file for complete search history.

(56) References Cited

U.S. PATENT DOCUMENTS

| | | | |
|---|---|---|---|
| 2,477,369 A * | 7/1949 | Goodwyn | B63H 25/10 74/498 |
| 9,333,913 B1 * | 5/2016 | Elders | G08G 1/0965 |
| 10,562,558 B1 * | 2/2020 | Spahn | B62D 1/10 |
| 11,225,226 B1 * | 1/2022 | Kim | B60T 7/042 |

(Continued)

FOREIGN PATENT DOCUMENTS

| | | | | |
|---|---|---|---|---|
| CN | 113335365 A | * | 9/2021 | ............... B62D 1/04 |
| CN | 113581275 A | * | 11/2021 | |

(Continued)

OTHER PUBLICATIONS

Machine Translation of CN-113335365-A.*

(Continued)

*Primary Examiner* — Adam D Rogers
(74) *Attorney, Agent, or Firm* — Ladas & Parry, LLP

(57) ABSTRACT

The present disclosure relates to a steering device and a control method thereof, and the steering device includes a wheel housing in which an inner space is formed, a driving member disposed in the inner space and providing power by receiving power, a cable having one side connected to a driving shaft of the driving member and the other side fixed to the wheel housing at a position spaced apart from the driving member, and an idle roller provided at a position spaced apart from the driving member and rotating while supporting the cable.

12 Claims, 6 Drawing Sheets

(56) References Cited

U.S. PATENT DOCUMENTS

2007/0295151 A1\* 12/2007 Kentor ................... B62D 1/06
                                                        74/552
2019/0071113 A1\* 3/2019 Board ..................... B62D 1/14
2020/0269900 A1\* 8/2020 Kawaguchi .............. F16C 1/12

FOREIGN PATENT DOCUMENTS

| DE | 102021200644 A1 | \* | 7/2022 | | |
| KR | 20190073754 A | \* | 6/2019 | .............. | B62D 1/06 |
| KR | 20190081517 A | \* | 7/2019 | .............. | B62D 1/04 |
| KR | 10-2020-0103789 | | 9/2020 | | |

OTHER PUBLICATIONS

Machine Translation of KR-20190073754-A.\*
Machine Translation of KR-20190081517-A.\*
Machine Translation of DE-102021200644-A1.\*
Machine Translation of CN-113581275-A.\*
"Chain Drive," Wikipedia Page, date by Wayback Machine to Jan. 29, 2020.\*
Office Action dated Sep. 19, 2023 for Korean Patent Application No. 10-2021-0174503 and its English translation from Global Dossier.

\* cited by examiner

STEERING DEVICE AND CONTROL METHOD THEREOF

CROSS-REFERENCE TO RELATED APPLICATION

This application claims priority under 35 U.S.C. § 119 to Korean Patent Application No. 10-2021-0174503, filed on Dec. 8, 2021, in the Korean Intellectual Property Office (KIPO), the disclosure of which is incorporated by reference herein in its entirety.

TECHNICAL FIELD

The present disclosure relates to a steering device and a control method thereof, and more particularly, to a steering device that can be folded or unfolded in an autonomous vehicle and a control method thereof.

BACKGROUND

In general, vehicles are equipped with various systems for protecting a driver and an occupant, assisting driving, and improving riding comfort.

Among these systems, an autonomous driving control system is a technology that uses a camera to recognize lanes and automatically steers, and measures a lane width, a lateral position of a vehicle on a lane, a distance to both lanes, and a shape of a lane, and a radius of curvature of a road based on image processing of a camera.

A driving trajectory of a vehicle is estimated using a vehicle position and road information thus obtained, and a lane is changed according to the estimated driving trajectory so that a driver can safely drive without holding a steering wheel.

A conventional general steering wheel includes of a hub as an armature base to which a steering column is coupled to a bottom surface, a rim installed outside the hub, and a spoke connecting the rim and the hub.

Even though the steering wheel of this structure is changed to autonomous driving mode for the user's convenience, the steering wheel is placed as it is in the original installed position, and space utilization is reduced because it does not provide additional space to the driver.

Therefore, it is necessary to develop a steering wheel that can secure a spare space in the vehicle when a vehicle is in autonomous driving mode and can be conveniently operated by the driver when the vehicle is in a driver driving mode.

SUMMARY

The present disclosure is to provide a steering device that is housed in an autonomous driving mode of a vehicle and operated in a partial protruding manner so that a driver can operate the steering in a driver mode, and a control method thereof.

According to one embodiment of the present disclosure, there is provided a steering device including: a wheel housing in which an inner space is formed; a driving member disposed in the inner space and providing power by receiving power; a cable having one side connected to a driving shaft of the driving member and the other side fixed to the wheel housing at a position spaced apart from the driving member; and an idle roller provided at a position spaced apart from the driving member and rotating while supporting the cable.

The wheel housing may include: a main body portion; and a handle portion connected to the main body portion and rotated with respect to the main body portion to protrude in a forward direction toward a driver.

The wheel housing may further include a flexible area provided between the main body portion and the handle portion.

The driving member may be provided in the main body portion, and the other side of the cable may be fixed to the handle portion.

The steering device may further include a rigidity reinforcement unit provided inside the wheel housing and having one side fixed to the main body portion and the other side fixed to the handle portion.

The rigidity reinforcement unit may include: a first fixing member provided in the main body portion; and one side hinged to the first fixing member and the other side fixed to the handle portion.

According to another embodiment of the present disclosure, there is provided a control method of a steering device, the control method including: detecting an operation of a steering device; determining a foldable state of a wheel housing when the operation of the steering device is detected; and determining a driving mode of a vehicle, in which the wheel housing includes a main body portion and a handle portion hinged to the main body portion, and the determining of the foldable state of the wheel housing includes determining whether a state where the handle portion is rotated with respect to the main body portion.

The steering device may include: a driving member provided in the main body portion and providing power by receiving power; a cable having one side connected to a driving shaft of the driving member and the other side fixed to the handle portion; and an idle roller provided in the main body portion and being rotated while supporting the cable.

The determining of the foldable state of the wheel housing may include determining by checking any one of whether power is supplied to the driving member, whether the driving member is operated, and whether or not the cable is connected.

When the foldable state of the wheel housing is in a normal state and the driving mode of the vehicle is a driver driving mode, the position of the handle portion may be maintained.

When the foldable state of the wheel housing is in a normal state and the driving mode of the vehicle is an autonomous driving mode, the position of the handle portion may be returned so that the handle portion is in parallel with the main body portion and a warning alarm may be executed.

When the foldable state of the wheel housing is in an abnormal state and the driving mode of the vehicle is an autonomous driving mode, a warning alarm may be executed and the autonomous driving mode may be maintained to induce the vehicle to stop.

When the foldable state of the wheel housing is in an abnormal state and the driving mode of the vehicle is a driver driving mode, a warning alarm may be executed and the driver driving mode may be maintained to induce the vehicle to stop.

In the warning alarm, a pop-up window may be exposed to an indoor instrument panel of the vehicle.

Details of other embodiments are included in the detailed description and drawings.

The steering device and the control method thereof according to the present disclosure have the following effects.

Even when the vehicle is converted from the autonomous driving mode to the driver driving mode, it is possible to operate the steering wheel by protruding only a part of the steering wheel housed in the dashboard without protruding the entire steering wheel, and thus, which it is possible to secure enough free space in a driver's seat.

DETAILED DESCRIPTION

Figure 1:
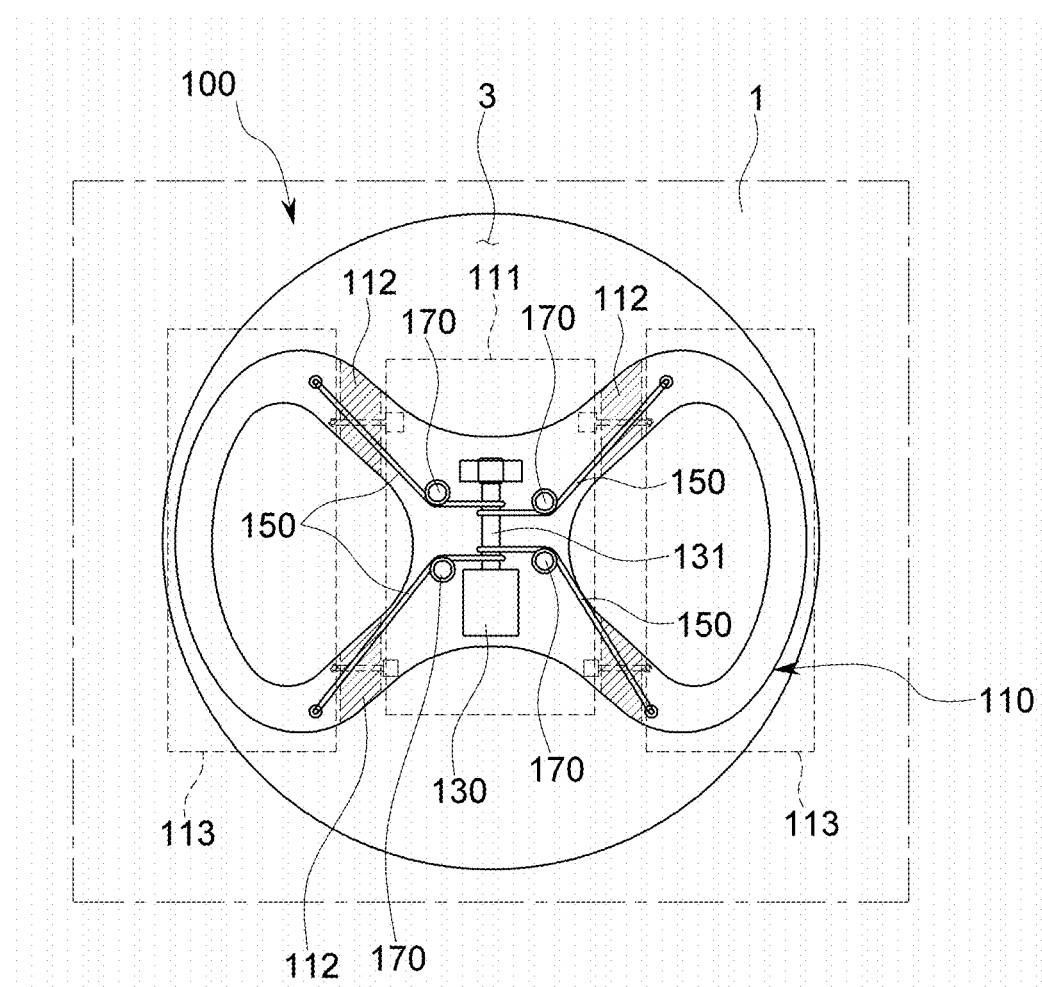
FIG. 1 is a front view schematically illustrating a steering device according to one embodiment of the present disclosure.

Hereinafter, with reference to the accompanying drawings, one embodiment of the present disclosure will be described in detail so that a person having ordinary knowledge in the technical field to which the present disclosure belongs can easily practice the present disclosure. The present disclosure may be implemented in several different forms and is not limited to the embodiments described herein.

It is advised that the drawings are schematic and not drawn to scale. Relative dimensions and proportions of parts in the drawings are illustrated exaggerated or reduced in size for clarity and convenience in the drawings, and any dimensions are illustrative only and not limiting. In addition, the same reference numerals are used to indicate similar features in the same structural elements or parts appearing in two or more drawings.

One embodiment of the present disclosure specifically represents an ideal embodiment of the present disclosure. As a result, various variations of the diagram are expected. Therefore, the embodiment is not limited to the specific shape of the illustrated area, and includes, for example, modification of the shape by manufacturing.

Hereinafter, a steering device and a control method thereof according to one embodiment of the present disclosure will be described in detail with reference to FIGS. 1 to 6C.

First, referring to FIGS. 1 to 4B, a steering device 100 includes a wheel housing 110, a driving member 130, a cable 150, and an idle roller 170.

A dashboard 1 having an interface such as an instrument panel is provided at the front of a vehicle interior. A storage space 3 is formed in the dashboard 1 to accommodate the steering device 100 therein.

The wheel housing 110 has an inner space and is provided in the storage space 3. The wheel housing 110 includes a main body portion 111 and a handle portion 113. The driving member 130 and the idle roller 170 are provided in the main body portion 111, and an inner space sufficient for these components to be provided is formed.

The handle portion 113 is connected to the main body portion 111. Specifically, a flexible region 112 is provided between the handle portion 113 and the main body portion 111. That is, the handle portion 113 and the main body portion 111 are connected by the flexible area 112.

In the present embodiment, the handle portion 113 is provided as a pair symmetrical with respect to the main body portion 111. However, it is not limited thereto. One handle portion 113 may be provided, or a plurality of hand portions 113 may be provided radially with respect to the main body portion 111.

The handle portion 113 is rotated relative to the main body portion 111. Specifically, the handle portion 113 is rotated to intersect the main body portion 111. The handle portion 113 protrudes forward toward the driver by being rotated. That is, the handle portion 113 protrudes from the storage space (not illustrated).

The flexible area 112 provides flexibility when the handle portion 113 is rotated relative to the main body portion 111. Accordingly, the flexible area 112 is formed of a flexible material. For example, the flexible area 112 is formed of a material such as leather or fabric.

Since the flexible area 112 is formed of a material having flexibility, the flexible area 112 is deformed to be stretched or bent when the handle portion 113 is rotated with respect to the main body portion 111, and then, restored when the handle portion 113 is stored in the storage space (not illustrated).

Meanwhile, rotation of the handle portion 113 relative to the main body portion 111 is performed by the driving member 130, the cable 150, and the idle roller 170.

The driving member 130 is provided in the inner space of the wheel housing 110. Specifically, the driving member 130 is provided in the inner space of the main body portion 111. The driving member 130 provides a rotational driving force for rotating the handle portion 113.

For example, the driving member 130 is provided as a motor. The driving member 130 is operated by receiving power from a power supply (not illustrated) provided inside the vehicle.

The cable 150 connects the driving member 130 and the handle portion 113. One side of the cable 150 is connected to a driving shaft 131 of the driving member 130, and the other side is connected to the handle portion 113. The driving shaft 131 means a rotating shaft of a motor.

The driving member 130 rotates when power is supplied from the power supply (not illustrated). That is, the driving shaft 131 is rotated. As the driving shaft 131 rotates, one side of the cable 150 connected to the driving shaft 131 is wound around the driving shaft 131.

When one side of the cable 150 is wound around the driving shaft 131, the other side of the cable 150 to which the handle portion 113 is connected is pulled. Accordingly, the handle portion 113 is rotated with respect to the main body portion 111 and protrudes forward toward the driver.

Conversely, when the driving member 130 reversely rotates, one side of the cable 150 wound around the driving shaft 131 is released, and the handle portion 113 rotates again with respect to the main body portion 111 and is aligned in parallel with the main body portion 111 and inserted into the storage space 3.

The idler roller 170 is positioned between the driving member 130 and the other side of the cable 150. The idler roller 170 serves to support the cable 150. When the cable 150 is wound or unwound from the driving shaft 131 as the drive motor 130 rotates, the idler roller 170 is rotated in conjunction with the movement of the cable 150 to support the cable 150.

Figure 2:
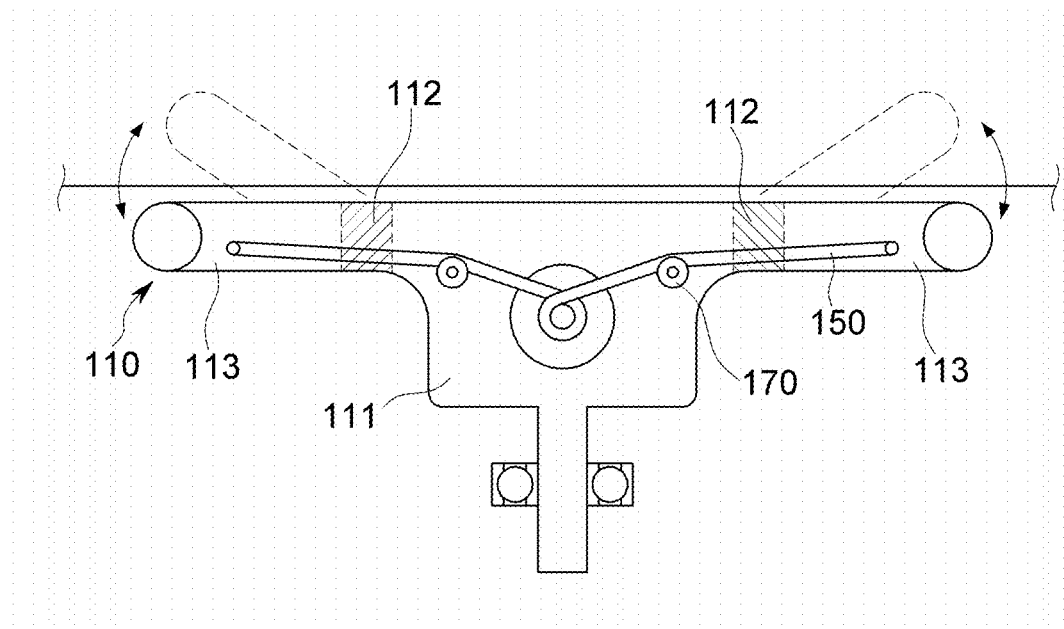
FIG. 2 is a side view of the steering device according to FIG. 1.
Figure 3:
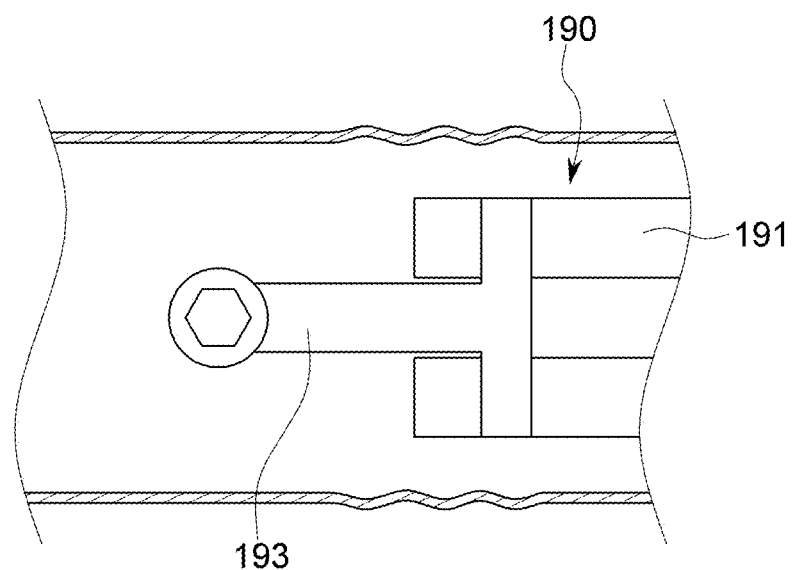
FIGS. 3, 4A and 4B are partial cross-sectional views illustrating a structure of a rigidity reinforcement unit of the steering device according to FIG. 1 in detail.

In the present embodiment, the cable 150 and the idler roller 170 are provided in plurality as illustrated in FIG. 2. Since the handle portion 113 is provided as a pair symmetrical with respect to the main body portion 111, at least one cable 150 is connected to one handle portion 113, and the idler roller 170 supporting the cable 150 is provided.

In the present embodiment, as illustrated in FIG. 2, two cables 150 are connected to one handle portion 113, and two idler rollers 170 are provided to support each cable 150. Therefore, in the present embodiment, a total of four cables 150 and idler rollers 170 are provided.

Meanwhile, the steering device 100 further includes a rigidity reinforcement unit 190. The rigidity reinforcement unit 190 reinforces the rigidity of the flexible area 112. As described above, the flexible area 112 is formed of a flexible material. In a driver driving mode, when a driver rotates the steering device 100, the flexible area 112 is deformed such as being bent. Accordingly, the driver's manipulation of the steering device 100 may not be normally recognized. Therefore, the rigidity reinforcement unit 190 is provided to reinforce the steering device 100 to have sufficient rigidity when the driver operates the steering device 100.

The rigidity reinforcement unit 190 includes a first fixing member 191 and a reinforcing rotation shaft 193. The first fixing member 191 is provided in the main body portion 111. The first fixing member 191 is formed in various shapes without limiting a specific shape.

The reinforcing rotation shaft 193 has one side connected to the first fixing member 191 and the other side connected to the handle portion 113. A direction in which the reinforcing rotation shaft 193 is disposed to intersect a direction in which the handle portion 113 is rotated with respect to the main body portion 111.

One side of the reinforcing rotation shaft 193 may be hinged to the first fixing member 191 and rotated. The other side of the reinforcing rotation shaft 193 is fixed to the handle portion 113.

Figure 4A:
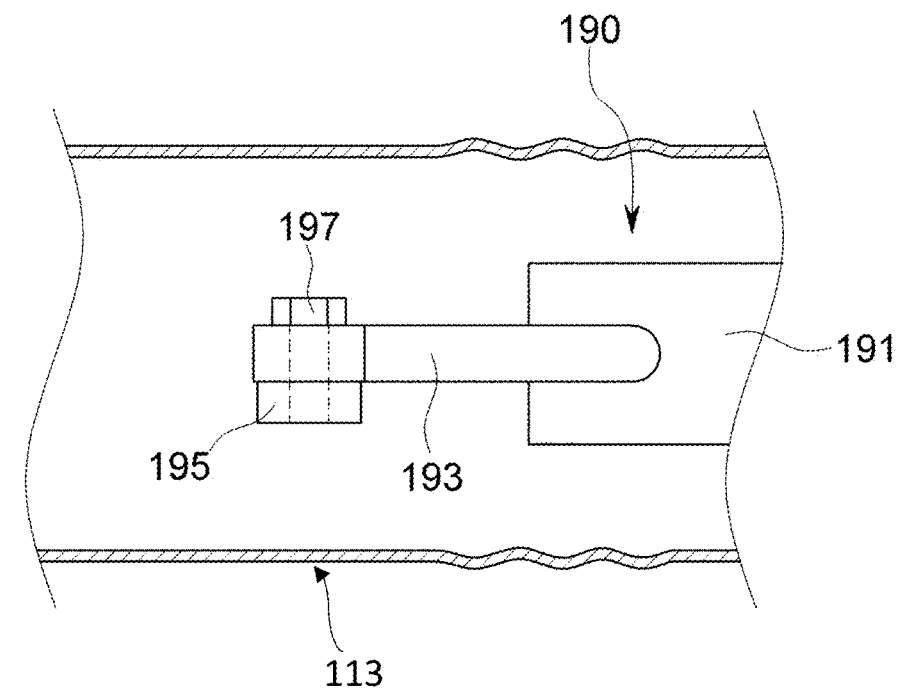
Figure 4B:
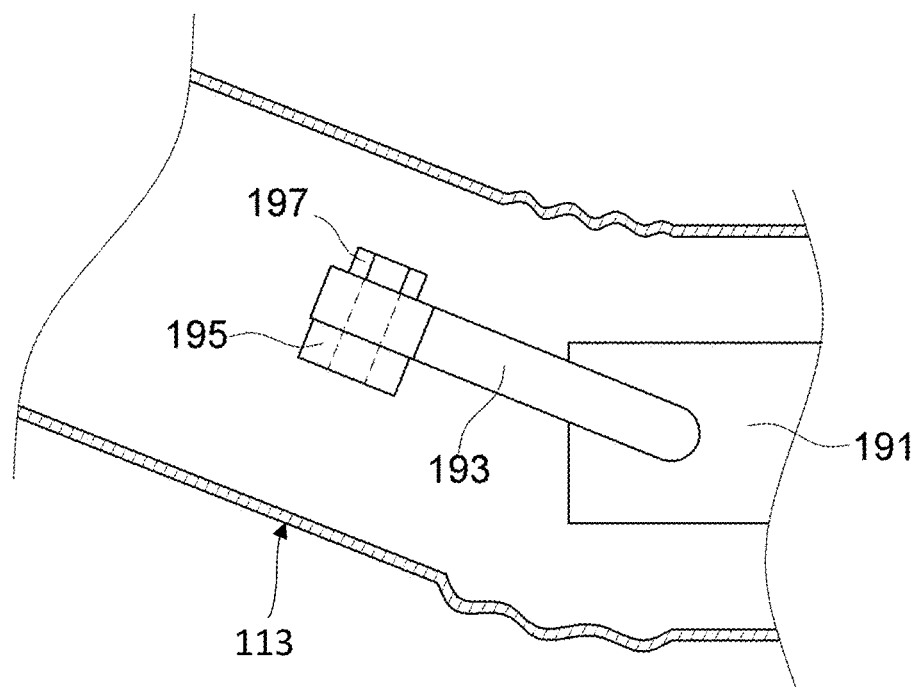

Therefore, when the handle portion 113 is rotated with respect to the main body portion 111, one side of the reinforcing rotation shaft 193 may be also rotated, and the other side of the reinforcing rotation shaft 193 may move along the handle portion 113 (refer to FIGS. 4A and 4B).

Meanwhile, referring to FIGS. 4A and 4B, a second fixing member 195 and a fastening member 197 may be further provided to fix the other side of the reinforcing rotation shaft 193. The second fixing member 195 is provided inside the handle portion 113. The fastening member 197 fixes the other side of the reinforcing rotation shaft 193 to the second fixing member 195. A bolt may be illustratively applied to the fastening member 197 and is coupled to the second fixing member 195 by penetrating the other side of the reinforcing rotation shaft 193.

In the present embodiment, the other side of the reinforcing rotation shaft 193 is connected to the handle portion 113 by the second fixing member 195 and the fastening member 197, but is not limited thereto. The reinforcing rotation shaft 193 may be directly fixed to the handle portion 113 without the second fixing member 195 and the fastening member 197.

As the rigidity reinforcement unit 190 is provided as described above, even when the driver rotates the steering device 100 in a case where the vehicle is in the driver driving mode, the flexible area 112 is not bent or deformed, and thus, the steering device 100 can be rotated accurately according to the driver's manipulation.

Figure 5:
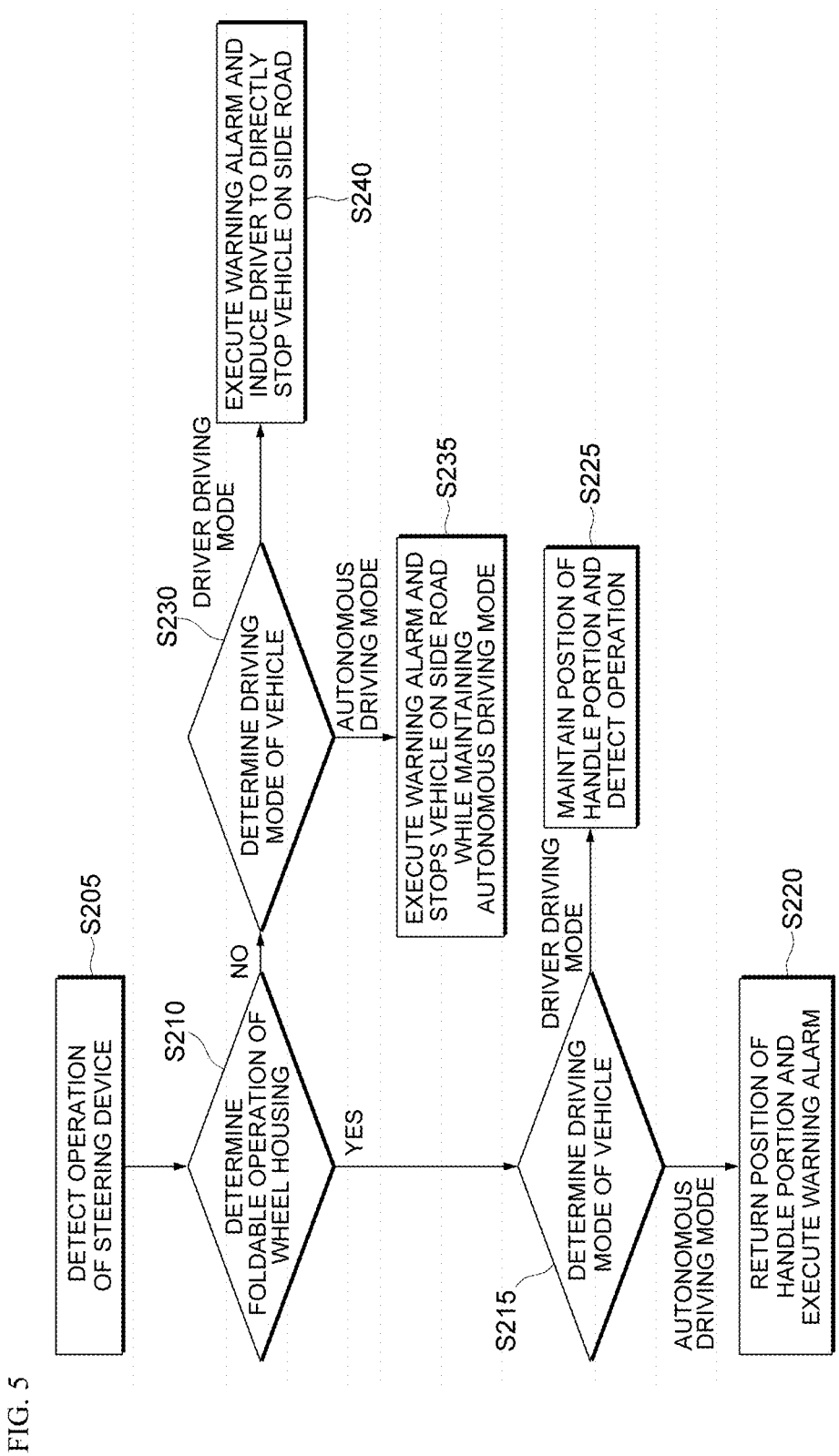
FIG. 5 is a block diagram illustrating a control method of a steering device according to one embodiment of the present disclosure.

Hereinafter, a control method of a steering device according to one embodiment of the present disclosure will be described with reference to FIGS. 5 to 6C.

First, an operation of the steering device 100 is detected (Step S205). The steering device 100 is operated when the driving of the vehicle starts. Therefore, a controller (not illustrated) provided in the vehicle can detect the operation of the steering device 100 through whether or not the driving of the vehicle starts.

When the operation of the steering device 100 is detected, it is determined whether a foldable state of the wheel housing 110 is in a normal operating state (Step S210). The foldable state is a state in which the handle portion 113 is rotated relative to the main body portion 111 so that the handle portion 113 protrudes forward toward the driver. That is, it is determined whether or not the rotated state of the handle portion 113 is normally performed.

The controller (not illustrated) determines whether the foldable state of the wheel housing 110 is in a normal operating state by determining any one of whether power is properly supplied to the driving member 130, whether the operation of the driving member 130 is properly performed, and whether the cable 150 connecting the driving member 130 and the handle portion 113 are normally connected.

For example, even when the wheel housing 110 is in the foldable state, power may not be supplied to the driving member 130, or the driving member 130 may not be operated or the cable 150 may be disconnected when switching from the foldable state to an un-foldable state.

When it is determined that the foldable state of the wheel housing 110 is normal in Step S210, the driving mode of the vehicle is determined (Step S215). That is, it is determined whether the vehicle is in an autonomous driving mode or a driver driving mode.

When it is determined that the driving mode of the vehicle is the autonomous driving mode, the controller (not illustrated) returns the position of the handle portion 113 and issues a warning alarm on the instrument panel (Step S220). When the position of the handle portion 113 is returned, the cable 150 is released while the driving member 130 reversely rotates, and the handle portion 113 is rotated to align with the main body portion 111 so as to be positioned in the storage space.

Figure 6A:
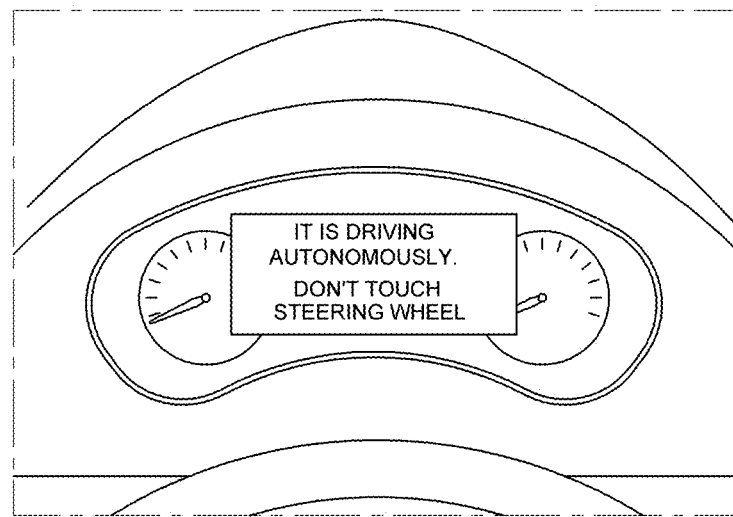
FIGS. 6A to 6C illustrates an example in which a warning alarm (pop-up screen of an instrument panel) is executed when controlling the steering device according to FIG. 5.

FIG. 6A illustrates an example of the warning alarm popped up on the instrument panel. As illustrated in FIG. 6A, a pop-up warning message is displayed to induce the driver not to touch the steering device 100, and the steering device 100 is placed in the storage space.

Meanwhile, the vehicle detects the operation of the steering device 100 (Step S205) and determines whether the foldable state of the wheel housing 110 is in a normal operating state (Step S210), and when it is determined that the driving mode of the vehicle is the driver mode, the foldable state of the wheel housing 110 is maintained (Step S225).

That is, the handle portion 113 is rotated with respect to the main body portion 111 to maintain a state in which the handle portion 113 protrudes forward toward the driver so that the driver can continue driving using the steering device 100.

After detecting the operation of the steering device 100 (Step S205), in the step of determining whether the foldable state of the wheel housing 110 is in the normal operating state (Step S210), the foldable state of the wheel housing 110 may be determined to be in an abnormal operating state.

Even after the foldable state of the wheel housing 110 is determined to be in an abnormal operating state, it is determined whether the driving mode of the vehicle is the autonomous driving mode or the driver driving mode (Step S230).

When it is determined that the driving mode of the vehicle is the autonomous driving mode in Step S230, the vehicle executes the warning alarm and stops the vehicle on a side road while maintaining the autonomous driving mode (Step S235).

Figure 6B:
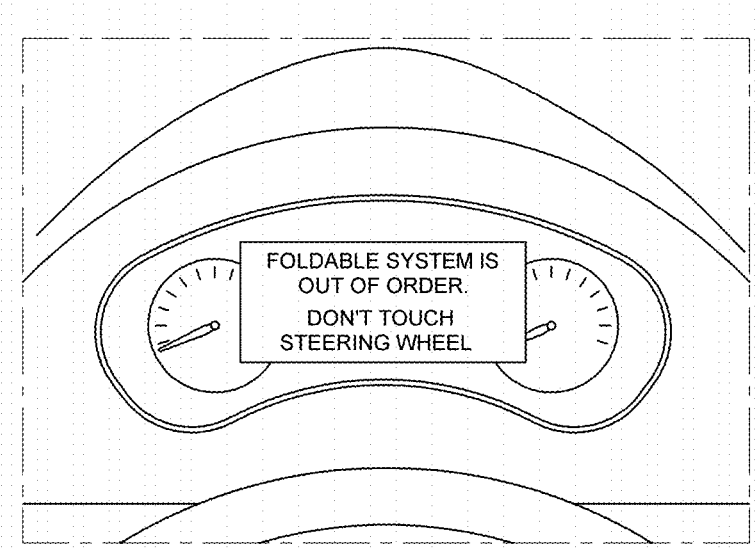

FIG. 6B illustrates a state in which a warning message pop-up appears on the indoor instrument panel as an example of a warning alarm. As illustrated in of FIG. 6B, a pop-up warning message is displayed to inform the driver that the foldable system of the wheel housing 110 is out of order, the driver is induced so that the driver does not touch the steering device 100, and the vehicle is stopped on a side road without continuing driving for safety.

Meanwhile, when it is determined that the driving mode of the vehicle is the driver driving mode in Step S230, the vehicle executes the warning alarm to induce the driver to stop the vehicle on the side road (Step S240).

Figure 6C:
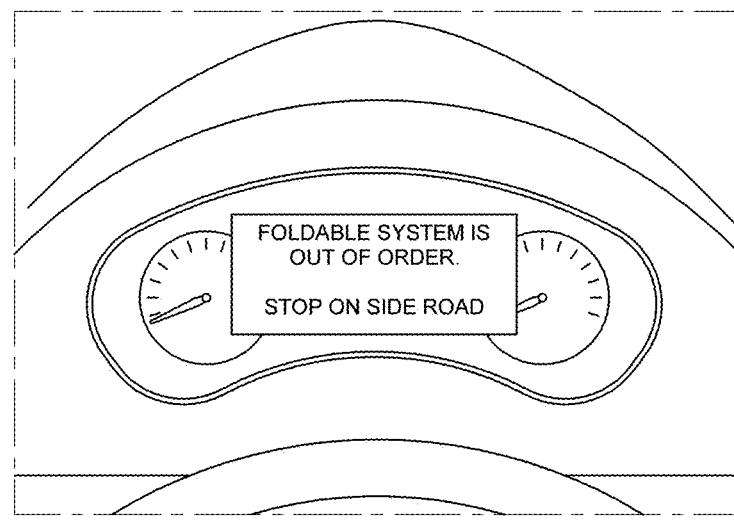

FIG. 6C illustrates a state in which the warning message pop-up appears on the indoor instrument panel as an example of the warning alarm when the foldable state is in the abnormal operating state and the vehicle is in the driver driving mode. As illustrated in of FIG. 6C, the pop-up warning message is displayed to inform the driver that the foldable system of the wheel housing 110 is out of order, and guides the driver so that the driver directly manipulate the steering device 100 to stop the vehicle on the side road for safety.

Although the embodiments of the present disclosure have been described with reference to the accompanying drawings, those skilled in the art to which the present disclosure belongs will be able to understand that the present disclosure may be implemented in other specific forms without changing its technical spirit or essential features.

Therefore, the embodiments described above should be understood as illustrative and not restrictive in all aspects, and the scope of the present disclosure is indicated by the following claims, and all changes or modifications derived from the meaning and scope of the claims and their equivalent concepts should be construed as being included in the scope of the present disclosure.

[Detailed Description of Main Elements]

| | |
|---|---|
| 1: dashboard | 3: storage space |
| 100: steering device | 110: wheel housing |
| 111: main body portion | 112: flexible area |
| 113: handle portion | 130: driving member |
| 150: cable | 170: idle roller |
| 190: rigidity reinforcement unit | 191: first fixing member |
| 193: reinforcing rotation shaft | 195: second fixing member |
| 195: fastening member | |

What is claimed is:

1. A steering device comprising:
   a wheel housing in which an inner space is formed, wherein the wheel housing comprises a main body portion, a handle portion connected to the main body portion and configured to be rotatable with respect to the main body portion to protrude in a direction toward a driver, and a flexible area provided between the main body portion and the handle portion;
   a driving member disposed in the inner space and providing power by receiving power;
   a cable having one side connected to a driving shaft of the driving member and another side fixed to the wheel housing at a position spaced apart from the driving member; and
   an idle roller provided at a position spaced apart from the driving member and rotating while supporting the cable.

2. The steering device of claim 1, wherein the driving member is provided in the main body portion, and the other side of the cable is fixed to the handle portion.

3. The steering device of claim 1, further comprising a rigidity reinforcement unit provided inside the wheel housing and having one side fixed to the main body portion and another side fixed to the handle portion.

4. The steering device of claim 3, wherein the rigidity reinforcement unit includes:
   a first fixing member provided in the main body portion; and
   a reinforcing rotation shaft having one side hinged to the first fixing member and another side fixed to the handle portion.

5. A control method of a steering device, the control method comprising:
   detecting an operation of a steering device;
   determining a foldable state of a wheel housing when the operation of the steering device is detected; and
   determining a driving mode of a vehicle,
   wherein the wheel housing includes a main body portion, a handle portion hinged to the main body portion, and a flexible area provided between the main body portion and the handle portion, and
   the determining of the foldable state of the wheel housing includes determining whether the handle portion is rotated with respect to the main body portion and protruded.

6. The control method of claim 5, wherein the steering device includes:
   a driving member provided in the main body portion and providing power;
   a cable having one side connected to a driving shaft of the driving member and the other side fixed to the handle portion; and
   an idle roller provided in the main body portion and being rotated while supporting the cable.

7. The control method of claim 6, wherein the determining of the foldable state of the wheel housing includes determining by checking any one of whether power is supplied to the driving member, whether the driving member is operated, and whether or not the cable is connected.

8. The control method of claim 5, wherein when the foldable state of the wheel housing is in a normal state and the driving mode of the vehicle is a driver driving mode, the position of the handle portion is maintained.

9. The control method of claim 5, wherein when the foldable state of the wheel housing is in a normal state and the driving mode of the vehicle is an autonomous driving mode, the position of the handle portion is returned so that the handle portion is in parallel with the main body portion and a warning alarm is executed.

10. The control method of claim 9, wherein in the warning alarm, a pop-up window is displayed on an indoor instrument panel of the vehicle.

11. The control method of claim 5, wherein when the foldable state of the wheel housing is in an abnormal state and the driving mode of the vehicle is an autonomous driving mode, a warning alarm is executed and the autonomous driving mode is maintained to induce the vehicle to stop.

12. The control method of claim 5, wherein when the foldable state of the wheel housing is in an abnormal state and the driving mode of the vehicle is a driver driving mode, a warning alarm is executed and the driver driving mode is maintained to induce the vehicle to stop.

* * * * *